United States Patent
Smuk et al.

(10) Patent No.: US 11,629,290 B2
(45) Date of Patent: Apr. 18, 2023

(54) LANTHANIDE METAL CHELATE SECURITY FEATURE

(71) Applicant: Spectra Systems Corporation, Providence, RI (US)

(72) Inventors: Andriy Smuk, Barrington, RI (US); Michael Bradlee, Providence, RI (US)

(73) Assignee: Spectra Systems Corporation, Providence, RI (US)

( * ) Notice: Subject to any disclaimer, the term of this patent is extended or adjusted under 35 U.S.C. 154(b) by 341 days.

(21) Appl. No.: 16/848,924

(22) Filed: Apr. 15, 2020

(65) Prior Publication Data
US 2021/0324264 A1 Oct. 21, 2021

(51) Int. Cl.
C09K 11/06 (2006.01)
C09D 5/22 (2006.01)
D21H 19/42 (2006.01)
D21H 21/48 (2006.01)
G01N 21/64 (2006.01)
C07F 5/00 (2006.01)

(52) U.S. Cl.
CPC .............. *C09K 11/06* (2013.01); *C07F 5/003* (2013.01); *C09D 5/22* (2013.01); *D21H 19/42* (2013.01); *D21H 21/48* (2013.01); *G01N 21/64* (2013.01); *C09K 2211/1029* (2013.01); *C09K 2211/1037* (2013.01); *C09K 2211/182* (2013.01)

(58) Field of Classification Search
CPC ........ D21H 21/48; D21H 21/40; C09K 11/06; C09K 2211/186
See application file for complete search history.

(56) References Cited

U.S. PATENT DOCUMENTS

2004/0220298 A1 11/2004 Kozee et al.
2008/0081913 A1 4/2008 Chauhan et al.

OTHER PUBLICATIONS

Seminara. Journal of Inorganic and Nuclear Chemistry, 1977, 39(4), 599-605 (Year: 1977).*
Patel. Journal of Applicable Chemistry, 2015, 4(6), 1774-1790 (Year: 2015).*
Zhang. Dalton Transactions, 2015, 44, 13586-13591 (Year: 2015).*
Seminara. Inorganica Chimica Acta, 1980, 44, L89-L92 (Year: 1980).*
Invitation to Pay Additional Fees and, Where Applicable, Protest Fee in PCT/US2021/027283 (Jun. 2, 2021).
Gao et al., "Two binuclear lanthanide complexes with 4-quinoline carboxylic acid: crystal structures and luminescent properties," J. Coord. Chem. (May 24, 2010) (Abstract).
Written Opinion of the International Searching Authority in PCT/US2021/027283 (dated Aug. 25, 2021).
International Search Report in PCT/US2021/027283 (dated Aug. 25, 2021).
Shavaleev et al., Benzothiazole- and Benzoxazole-Substituted Pyridine-2-Carboxylates as Efficient Sensitizers of Europium Luminescence, Inorganic Chem. 48(13):6178-6191 (May 14, 2009).
PubChem, SID 388534510, Available Date: Dec. 6, 2019, available at https://pubchem.ncbi.nlm.nih.gov/substance/388534510.

(Continued)

*Primary Examiner* — Noble E Jarrell
(74) *Attorney, Agent, or Firm* — Pryor Cashman LLP

(57) ABSTRACT

A chelate and associated security feature including a lanthanide metal and a ligand of formula (1), formula (2), or formula (3),

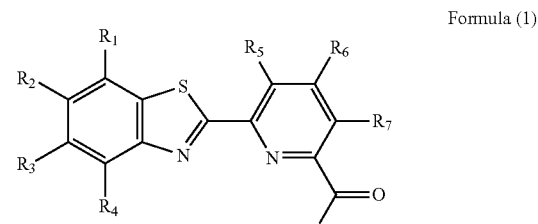

Formula (1)

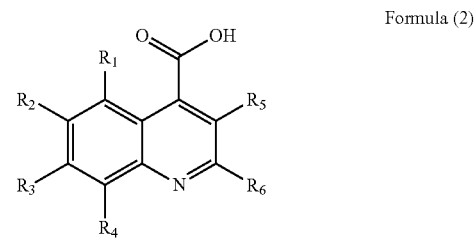

Formula (2)

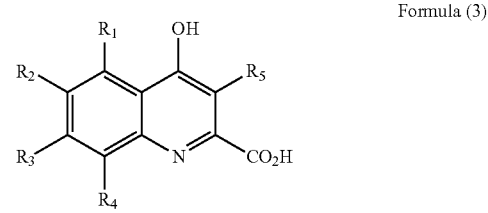

Formula (3)

where each of $R_1$-$R_7$ in formula (1) is independently selected from the group consisting of H, OH, $NH_2$, Cl, F, OMe, OAr, $OCF_3$, $CF_3$, alkyl, aryl, phenyl, OPh, and heteroaromatic, where each of $R_1$-$R_5$ in formula (2) is independently selected from the group consisting of H, OH, $NH_2$, Cl, F, OMe, OAr, $OCF_3$, $CF_3$, $NMe_2$, CN, alkyl, aryl, phenyl, OPh, and heteroaromatic, and where $R_6$ in formula (2) is selected from the group consisting of H, $NH_2$, Cl, F, OMe, OAr, $OCF_3$, $CF_3$, $NMe_2$, CN, alkyl, aryl, phenyl, OPh, and heteroaromatic, and where each of $R_1$-$R_5$ in formula (3) is independently selected from the group consisting of H, OH, $NH_2$, Cl, F, OMe, OAr, $OCF_3$, $CF_3$, alkyl, aryl, phenyl, OPh, and heteroaromatic.

13 Claims, 1 Drawing Sheet

(56) References Cited

OTHER PUBLICATIONS

Gao et al., Two binuclear lanthanide complexes with 4-quinoline carboxylic acid: crystal structure and luminescent properties, J. Coordination Chem. 62(16) (May 24, 2010).

* cited by examiner

LANTHANIDE METAL CHELATE SECURITY FEATURE

TECHNICAL FIELD

The present invention generally relates to security features. More specifically, the present invention relates to lanthanide metal chelate security features capable of fluorescence in response to ultraviolet radiation.

BACKGROUND OF THE INVENTION

Counterfeiting and forgery have become significant concerns in the modem economy and marketplace. Advances in computing technology and printing techniques have increased the incidence of forgeries, counterfeited documents, and other fraudulent activities. Countless areas of today's high-technology society require and rely upon certification, authentication and protection of highly valuable documents, papers, currency and other materials. Thus, there is a need for security features to be incorporated into currency, important documents, packaging, and other authentic items to prevent unauthorized copying, forging, counterfeiting and other fraudulent use.

A similar problem exists in a variety of contexts. In addition to protecting against counterfeit currency, authentication of valuable documents or materials also affects many facets of the economy. Authentication stamps such as visas or postmarks, for example, are subject to fraudulent use and forgery. Also, a wide variety of products and consumer goods may be created as knock-offs, cheap replacements, or gray market goods. Notaries public use a raised stamp to authenticate notarized documents. Drivers' licenses, passports, and other photographic identification contain holograms and microprinting. Sporting memorabilia and retail clothiers use holographic tags and stamps to assist in proving authenticity. Fashion designers are including authentication devices in their clothing to prevent passing off of knock-offs as designer products.

A disadvantage to most of the traditional security features is that they are visible and known to the world. If a counterfeiter is aware there is a security thread in a bill or a watermark in a document, replication of the security feature is easier. Once a feature is made known to the public, a counterfeiter may begin to develop specific strategies and solutions to overcome the security protections provided by the specific feature.

As a result, for ensuring authenticity of certain documents, specific materials have been developed that appear invisible to the naked eye in visible light but may be observed in response to illumination with light or radiation of a particular wavelength, such as ultraviolet radiation, which gives rise to fluorescence or phosphorescence of the material, in turn making the materials visible. Typically, as the exposure to the particular light or radiation, e.g., ultraviolet radiation, stops and after a very short time, the material reassumes its initial, non-visible appearance. The type of compound responsible for this phenomenon absorbs light or radiation at a certain wavelength and reemits light or radiation at a different or higher wavelength for the exposure time. One such family of compounds are rare earth metal compounds having at least one lanthanide metal and a 2-hydroxyquinoline-4-carboxylic acid, which luminesce in response to ultraviolet radiation, e.g., radiation between 250 nm and 400 nm.

Accordingly, there is a need for improved security features, such as those having superior emission characteristics, higher lightfastness, particularly in response to ultraviolet radiation, and responsiveness over a wider spectral band of wavelengths.

SUMMARY OF THE INVENTION

In general, in one aspect, the invention features a chelate for use in a security feature for authentication of an article, including a lanthanide metal and a ligand of formula (1), formula (2), or formula (3),

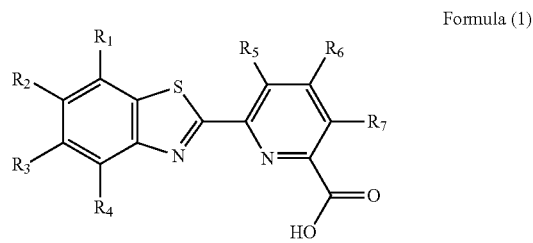

Formula (1)

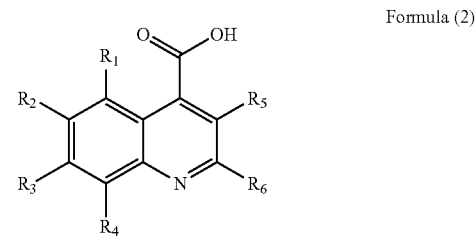

Formula (2)

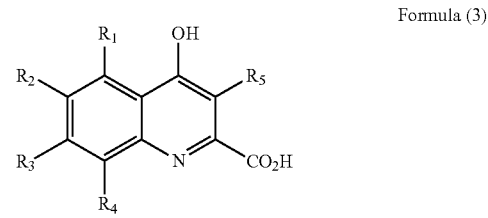

Formula (3)

where each of $R_1$-$R_7$ in formula (1) is independently selected from the group consisting of H, OH, $NH_2$, Cl, F, OMe, OAr, $OCF_3$, $CF_3$, alkyl, aryl, phenyl, OPh, and heteroaromatic, where each of $R_1$-$R_5$ in formula (2) is independently selected from the group consisting of H, OH, $NH_2$, Cl, F, OMe, OAr, $OCF_3$, $CF_3$, $NMe_2$, CN, alkyl, aryl, phenyl, OPh, and heteroaromatic, and where $R_6$ in formula (2) is selected from the group consisting of H, $NH_2$, Cl, F, OMe, OAr, $OCF_3$, $CF_3$, $NMe_2$, CN, alkyl, aryl, phenyl, OPh, and heteroaromatic, and where each of $R_1$-$R_5$ in formula (3) is independently selected from the group consisting of H, OH, $NH_2$, Cl, F, OMe, OAr, $OCF_3$, $CF_3$, alkyl, aryl, phenyl, OPh, and heteroaromatic.

Implementations of the invention may include one or more of the following features. The lanthanide metal may be Europium. The ligand may be a ligand of formula (1), and more specifically, a ligand of formula (5), where $R_1$ in formula (5) is selected from the group consisting of H, F, $OCF_3$, and $CF_3$, and where each of $R_2$ and $R_3$ in formula (5) is independently selected from the group consisting of H, OH, and $NH_2$. The ligand may be a ligand of formula (3), and more specifically, a ligand of formula (6), where R in formula (6) is selected from the group consisting of H, F, $OCF_3$, $CF_3$, OMe, and OPh.

Formula (5)

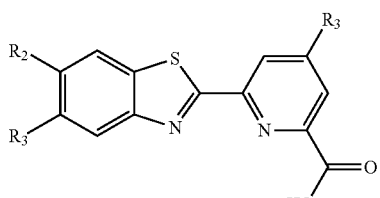

Formula (6)

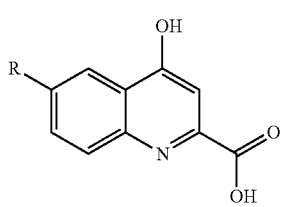

In general, in another aspect, the invention features a security feature for use in authenticating an article, including a carrier and an additive disposed in or on the carrier, where the additive is a chelate including a lanthanide metal and a ligand of formula (1), formula (2), or formula (3), Formula (1)

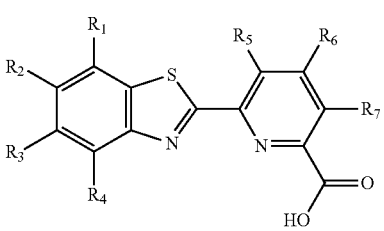

Formula (2)

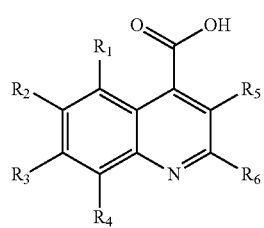

Formula (3)

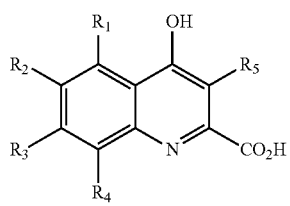

where each of $R_1$-$R_7$ in formula (1) is independently selected from the group consisting of H, OH, $NH_2$, Cl, F, OMe, OAr, $OCF_3$, $CF_3$, alkyl, aryl, phenyl, OPh, and heteroaromatic, where each of $R_1$-$R_5$ in formula (2) is independently selected from the group consisting of H, OH, $NH_2$, Cl, F, OMe, OAr, $OCF_3$, $CF_3$, $NMe_2$, CN, alkyl, aryl, phenyl, OPh, and heteroaromatic, and where $R_6$ in formula (2) is selected from the group consisting of H, $NH_2$, Cl, F, OMe, OAr, $OCF_3$, $CF_3$, $NMe_2$, CN, alkyl, aryl, phenyl, OPh, and heteroaromatic, and where each of $R_1$-$R_5$ in formula (3) is independently selected from the group consisting of H, OH, $NH_2$, Cl, F, OMe, OAr, $OCF_3$, $CF_3$, alkyl, aryl, phenyl, OPh, and heteroaromatic.

Implementations of the invention may include one or more of the following features. The lanthanide metal may be Europium. The ligand may be a ligand of formula (1), and more specifically, a ligand of formula (5), where $R_1$ in formula (5) is selected from the group consisting of H, F, $OCF_3$, and $CF_3$, and where each of $R_2$ and $R_3$ in formula (5) is independently selected from the group consisting of H, OH, and $NH_2$. The ligand may be a ligand of formula (3), and more specifically, a ligand of formula (6), where R in formula (6) is selected from the group consisting of H, F, $OCF_3$, $CF_3$, OMe, and OPh. The carrier may be a paper substrate, a polymer substrate an ink, a coating, a security thread, a fiber, or a planchette.

Formula (5)

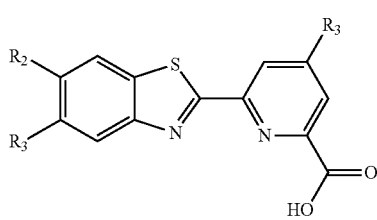

Formula (6)

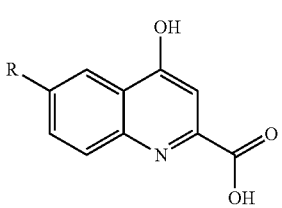

In general, in another aspect, the invention features a method of authenticating an article, including providing an article including a security feature, and irradiating the article with a radiation source to excite the security feature, where the security feature includes a carrier and an additive disposed in or on the carrier, where the additive is a chelate including a lanthanide metal and a ligand of formula (1), formula (2), or formula (3), Formula (1)

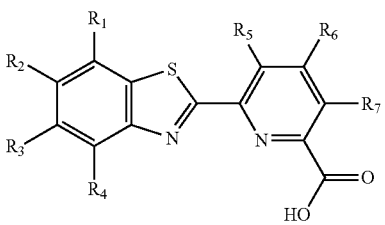

Formula (2)

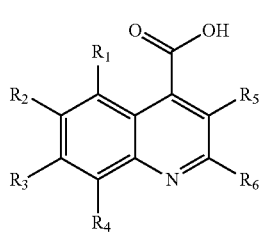

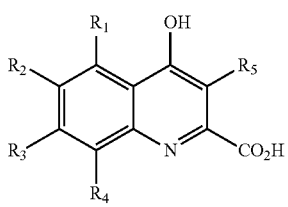

where each of $R_1$-$R_7$ in formula (1) is independently selected from the group consisting of H, OH, $NH_2$, Cl, F, OMe, OAr, $OCF_3$, $CF_3$, alkyl, aryl, phenyl, OPh, and heteroaromatic, where each of $R_1$-$R_5$ in formula (2) is independently selected from the group consisting of H, OH, $NH_2$, Cl, F, OMe, OAr, $OCF_3$, $CF_3$, $NMe_2$, CN, alkyl, aryl, phenyl, OPh, and heteroaromatic, and where $R_6$ in formula (2) is selected from the group consisting of H, $NH_2$, Cl, F, OMe, OAr, $OCF_3$, $CF_3$, $NMe_2$, CN, alkyl, aryl, phenyl, OPh, and heteroaromatic, and where each of $R_1$-$R_5$ in formula (3) is independently selected from the group consisting of H, OH, $NH_2$, Cl, F, OMe, OAr, $OCF_3$, $CF_3$, alkyl, aryl, phenyl, OPh, and heteroaromatic.

Implementations of the invention may include one or more of the following features. The lanthanide metal may be Europium. The ligand may be a ligand of formula (1), and more specifically, a ligand of formula (5), where $R_1$ in formula (5) is selected from the group consisting of H, F, $OCF_3$, and $CF_3$, and where each of $R_2$ and $R_3$ in formula (5) is independently selected from the group consisting of H, OH, and $NH_2$. The ligand may be a ligand of formula (3), and more specifically, a ligand of formula (6), where R in formula (6) is selected from the group consisting of H, F, $OCF_3$, $CF_3$, OMe, and OPh. The carrier may be a paper substrate, a polymer substrate, an ink, a coating, a security thread, a fiber, or a planchette. The radiation source may be an ultraviolet (UV) light source. The article may be a banknote, an ID document, a visa document, a tax stamp, a label, or a packaging. Excitation of the security feature may include fluorescing of the security feature.

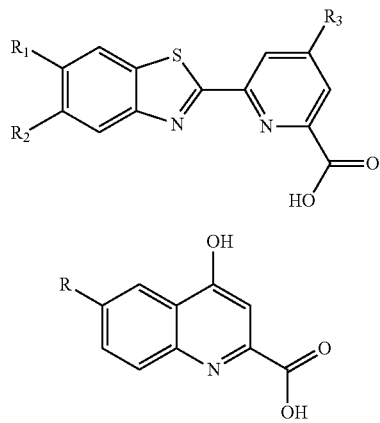

DETAILED DESCRIPTION OF THE INVENTION

Figure 1:
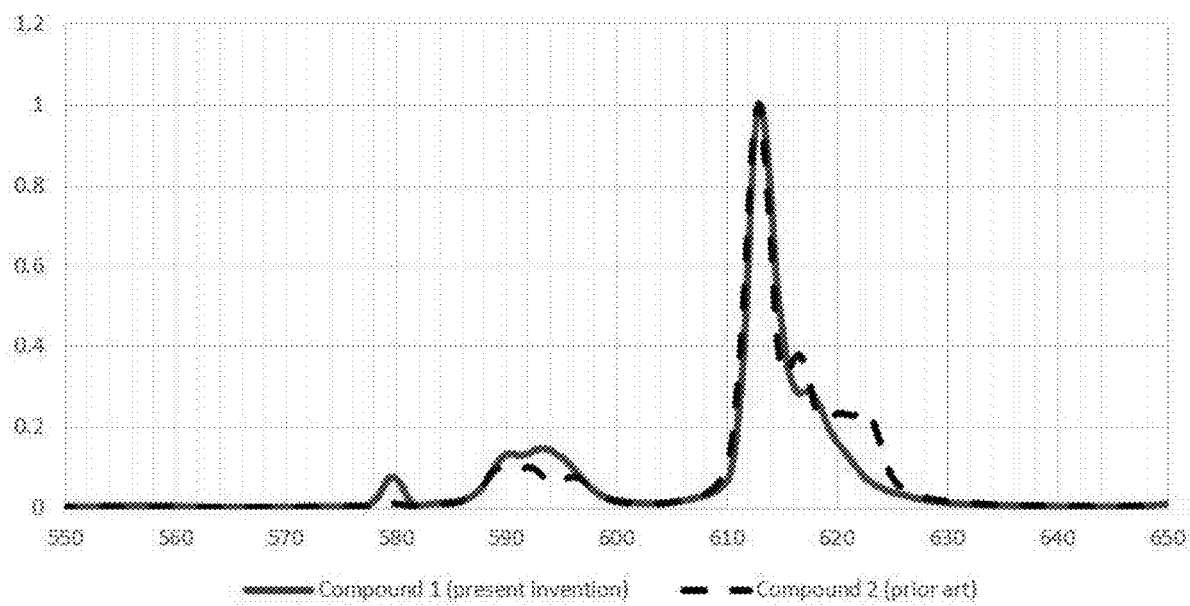
FIG. 1 shows normalized emission spectra for a known compound and a compound of one embodiment of the present invention.

The present invention is directed to optical or visual security features based on particular fluorescent rare earth metal compounds, such as chelates composed of a lanthanide metal and a specific ligand, including the ligand of formula (1), formula (2), or formula (3). The lanthanide metal may be selected from any chemical element in the lanthanide series. In a preferred embodiment, the lanthanide metal is Europium.

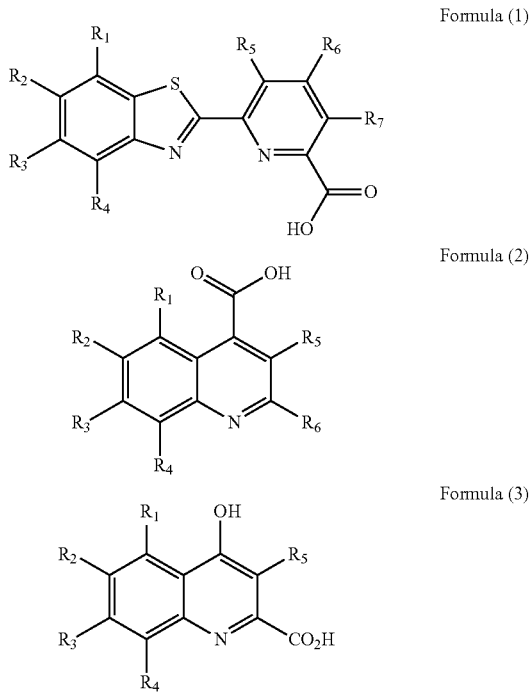

Concerning the substituent groups for formulas (1)-(3), each of $R_1$-$R_7$ in formula (1) may be independently selected from the group consisting of H, OH, $NH_2$, Cl, F, OMe, OAr, $OCF_3$, $CF_3$, alkyl, aryl, phenyl, OPh, and heteroaromatic, each of $R_1$-$R_5$ in formula (2) may be independently selected from the group consisting of H, OH, $NH_2$, Cl, F, OMe, OAr, $OCF_3$, $CF_3$, NMe2, CN, alkyl, aryl, phenyl, OPh, and heteroaromatic, $R_6$ in formula (2) may be selected from the group consisting of H, $NH_2$, Cl, F, OMe, OAr, $OCF_3$, $CF_3$, $NMe_2$, CN, alkyl, aryl, phenyl, OPh, and heteroaromatic, and each of $R_1$-$R_5$ in formula (3) may be independently selected from the group consisting of H, OH, $NH_2$, Cl, F, OMe, OAr, $OCF_3$, $CF_3$, alkyl, aryl, phenyl, OPh, and heteroaromatic. The ligands of formulas (1)-(3) may exist in different tautomeric forms, and all such forms where such forms exist are included herein. Additionally, optical isomers and racemates of the ligands of formulas (1)-(3) where such forms exist are included herein.

A non-limiting example of a ligand of formula (1) is a ligand of formula (5), where $R_1$ in formula (5) may be selected from the group consisting of H, F, $OCF_3$, and $CF_3$, and each of $R_2$ and $R_3$ in formula (5) may be independently selected from the group consisting of H, OH, and $NH_2$. A non-limiting example of a ligand of formula (3) is a ligand of formula (6), where R in formula (6) may be selected from the group consisting of H, F, $OCF_3$, $CF_3$, OMe, and OPh. A non-limiting example of a ligand of formula (5) is the ligand of formula (7), and a non-limiting example of a ligand of formula (6) is the ligand of formula (8).

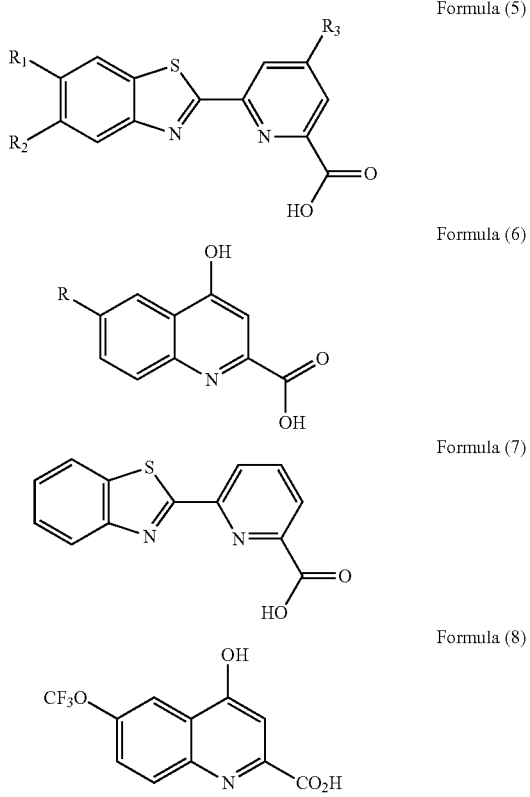

Formula (5)

Formula (6)

Formula (7)

Formula (8)

Chelates composed of a lanthanide metal and a ligand of formulas (1)-(3) have been shown to demonstrate fluorescent emissions over a wide spectral band of wavelengths, particularly in the ultraviolet (UV) region, making these compounds suitable for use in security and authentication applications. In one non-limiting example, a red phosphor being a chelate of Europium and 4-hydroxy-2-quinoline carboxylic acid has been determined to possess superior emissive properties, including high spectral emissions and good light fastness in response to irradiation at atypical wavelengths, e.g., 280 nm. These properties resulting from the selection of 4-hydroxy-2-quinoline carboxylic acid as the desired ligand are unexpected, particularly in comparison to usage of 2-hydroxy-4-quinoline carboxylic acid, a known ligand, which fails to retain light fastness as such atypical wavelengths.

Fluorescent rare earth metal compounds utilizing such known ligands, as disclosed in Potrawa et al. (US 20070051929 A1), have been described as fluorescing in response to irradiating sources having a wavelength of 366 nm. This wavelength is typically associated with low-pressure mercury lamps, which were the dominant, if not exclusive, UV light source for document security applications prior to the introduction of low-cost efficient UV-LEDs. These UV-LEDs have different peak wavelengths compared to low-pressure mercury lamps, in particular wavelengths in the range of 370 to 385 nm, thereby requiring the selection of compounds having fluorescence intensity attributes responsive to these different illumination wavelengths.

FIG. 1 shows normalized emission spectra for a known compound, specifically 2-hydroxy-4-carboxylic acid Europium chelate ("Compound 2"), and a compound of one embodiment of the present invention, specifically 4-hydroxy-2-carboxylic acid Europium chelate ("Compound 1"). As illustrated in this emission spectra, both 2-hydroxy-4-carboxylic acid Europium chelate and 4-hydroxy-2-carboxylic acid Europium chelate are shown to have the same emission peak at 613 nm.

Figure 2:
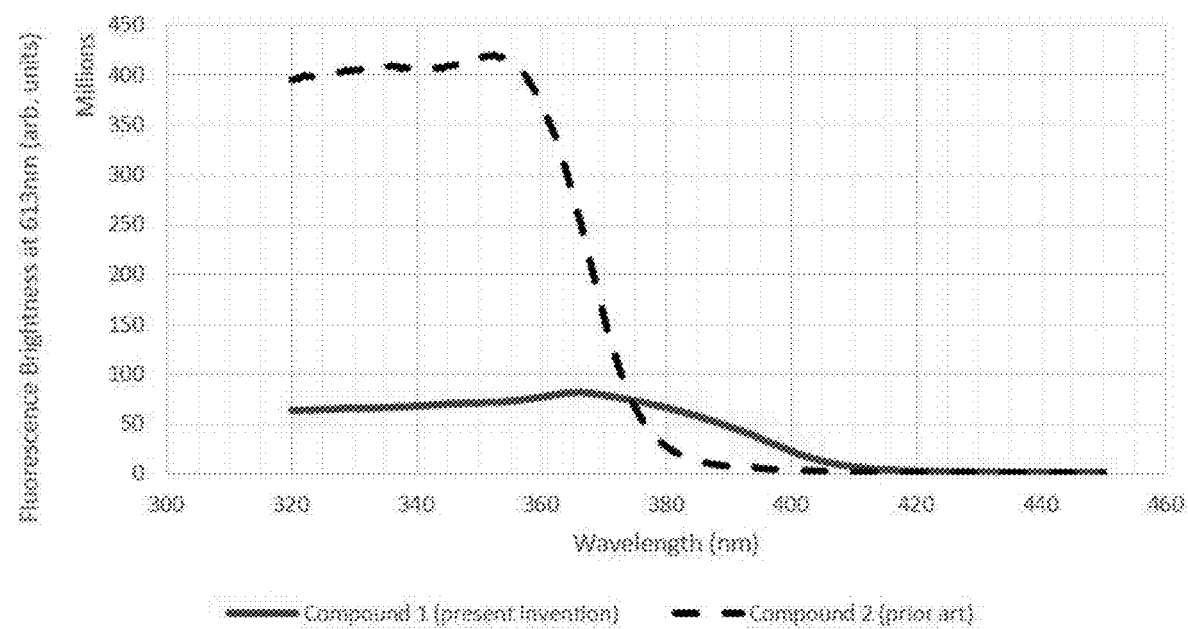
FIG. 2 shows excitation spectra for a known compound and a compound of one embodiment of the present invention.

FIG. 2 shows excitation spectra for a known compound, specifically 2-hydroxy-4-carboxylic acid Europium chelate ("Compound 2"), and a compound of one embodiment of the present invention, specifically 4-hydroxy-2-carboxylic acid Europium chelate ("Compound 1"). As illustrated in this excitation spectra, 2-hydroxy-4-carboxylic acid Europium chelate is more effective than 4-hydroxy-2-carboxylic acid Europium chelate when irradiated at wavelengths below 374 nm; however, at wavelengths above 374 nm, 4-hydroxy-2-carboxylic acid Europium chelate is superior. Moreover, while 4-hydroxy-2-carboxylic acid Europium chelate does not have the same maximum fluorescence brightness as 2-hydroxy-4-carboxylic acid Europium chelate, which occurs for 2-hydroxy-4-carboxylic acid Europium chelate when irradiated at wavelengths below 374 nm, 4-hydroxy-2-carboxylic acid Europium chelate fluoresces over a longer or wider spectral band of wavelengths than 2-hydroxy-4-carboxylic acid Europium chelate, particularly further in the region of the spectrum beyond 374 nm.

The compounds of the present invention may be utilized in connection with security and authentication applications. Embodiments of the invention include systems and methods for document and product authentication based on irradiation and fluorescent emission detection. The compounds may be disposed in or on, or otherwise added to, a carrier material, the carrier material including but not limited to paper substrates, polymer substrates, inks, coatings, security threads, fibers, and planchettes, which can be utilized in the authentication and protection of items such as documents, currency, and secondary packaging for tobacco, luxury goods, and pharmaceuticals. Non-limiting examples of such items include banknotes, ID documents, visa documents, tax stamps, labels, and packaging. In an authentication method of present invention, an article includes a security feature disposed with a fluorescent rare earth metal compound, as has been described herein. The article is irradiated with a radiation source, particularly a UV light source, which may be in the range of 370 to 385 nm, greater than 374 nm, or simply not 365 or 366 nm, which results in excitation and fluorescence of the security feature by virtue of the fluorescent rare earth metal compound disposed therein or thereon.

The embodiments and examples above are illustrative, and many variations can be introduced to them without departing from the spirit of the disclosure. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the accompanying drawings and descriptive matter in which there are illustrated exemplary embodiments of the invention.

What is claimed is:

1. A security feature for use in authenticating an article, comprising:
a carrier; and
an additive disposed in or on the carrier,
wherein the additive is a chelate comprising:
a lanthanide metal; and
a ligand of formula (1), formula (2), or formula (3),

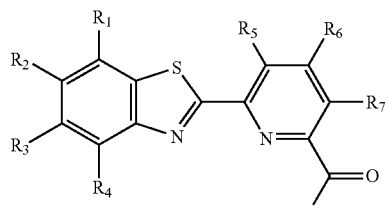

Formula (1)

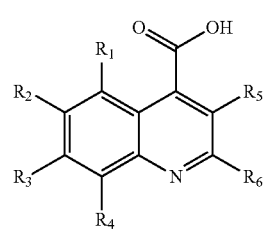

Formula (2)

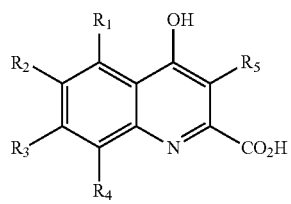

Formula (3)

wherein each of $R_1$-$R_7$ in formula (1) is independently selected from the group consisting of H, OH, $NH_2$, Cl, F, OMe, OAr, $OCF_3$, $CF_3$, alkyl, aryl, phenyl, OPh, and heteroaromatic, wherein each of $R_1$-$R_5$ in formula (2) is independently selected from the group consisting of H, OH, $NH_2$, Cl, F, OMe, OAr, $OCF_3$, $CF_3$, $NMe_2$, CN, alkyl, aryl, phenyl, OPh, and heteroaromatic, and wherein $R_6$ in formula (2) is selected from the group consisting of H, $NH_2$, Cl, F, OMe, OAr, $OCF_3$, $CF_3$, $NMe_2$, CN, alkyl, aryl, phenyl, OPh, and heteroaromatic, and wherein each of $R_1$-$R_5$ in formula (3) is independently selected from the group consisting of H, OH, $NH_2$, Cl, F, OMe, OAr, $OCF_3$, $CF_3$, alkyl, aryl, phenyl, OPh, and heteroaromatic.

2. The security feature of claim 1, wherein the lanthanide metal is Europium.

3. The security feature of claim 1, wherein the ligand is a ligand of formula (1), wherein the ligand of formula (1) is a ligand of formula (5), wherein $R_1$ in formula (5) is selected from the group consisting of H, F, $OCF_3$, and $CF_3$, and wherein each of $R_2$ and $R_3$ in formula (5) is independently selected from the group consisting of H, OH, and $NH_2$

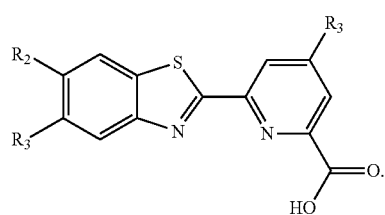

Formula (5)

4. The security feature of claim 1, wherein the ligand is a ligand of formula (3), wherein the ligand of formula (3) is a ligand of formula (6), and wherein R in formula (6) is selected from the group consisting of H, F, $OCF_3$, $CF_3$, OMe, and OPh

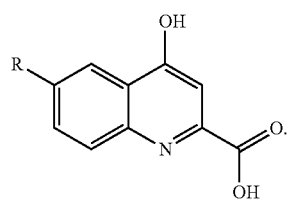

Formula (6)

5. The security feature of claim 1, wherein the carrier is a paper substrate, a polymer substrate, an ink, a coating, a security thread, a fiber, or a planchette.

6. A method of authenticating an article, comprising:
providing an article including a security feature; and
irradiating the article with a radiation source to excite the security feature,
wherein the security feature comprises:
a carrier; and
an additive disposed in or on the carrier,
wherein the additive is a chelate comprising:
a lanthanide metal; and
a ligand of formula (1), formula (2), or formula (3),

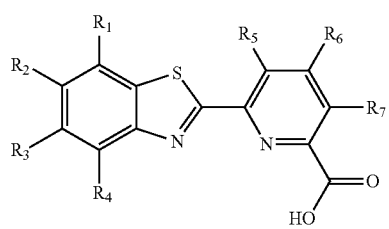

Formula (1)

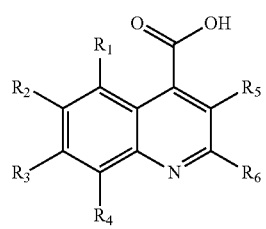

Formula (2)

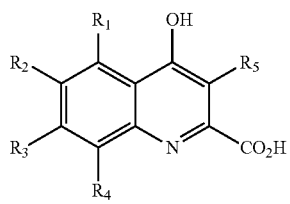

Formula (3)

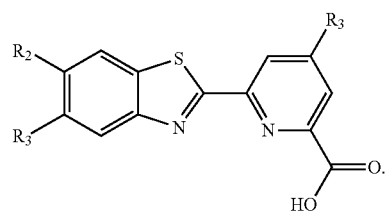

Formula (5)

wherein each of $R_1$-$R_7$ in formula (1) is independently selected from the group consisting of H, OH, $NH_2$, Cl, F, OMe, OAr, $OCF_3$, $CF_3$, alkyl, aryl, phenyl, OPh, and heteroaromatic, wherein each of $R_1$-$R_5$ in formula (2) is independently selected from the group consisting of H, OH, $NH_2$, Cl, F, OMe, OAr, $OCF_3$, $CF_3$, $NMe_2$, CN, alkyl, aryl, phenyl, OPh, and heteroaromatic, and wherein $R_6$ in formula (2) is selected from the group consisting of H, $NH_2$, Cl, F, OMe, OAr, $OCF_3$, $CF_3$, $NMe_2$, CN, alkyl, aryl, phenyl, OPh, and heteroaromatic, and wherein each of $R_1$-$R_5$ in formula (3) is independently selected from the group consisting of H, OH, $NH_2$, Cl, F, OMe, OAr, $OCF_3$, $CF_3$, alkyl, aryl, phenyl, OPh, and heteroaromatic.

7. The method of claim 6, wherein the lanthanide metal is Europium.

8. The method of claim 6, wherein the ligand is a ligand of formula (1), wherein the ligand of formula (1) is a ligand of formula (5), wherein $R_1$ in formula (5) is selected from the group consisting of H, F, $OCF_3$, and $CF_3$, and wherein each of $R_2$ and $R_3$ in formula (5) is independently selected from the group consisting of H, OH, and $NH_2$

9. The method of claim 6, wherein the ligand is a ligand of formula (3), wherein the ligand of formula (3) is a ligand of formula (6), and wherein R in formula (6) is selected from the group consisting of H, F, $OCF_3$, $CF_3$, OMe, and OPh

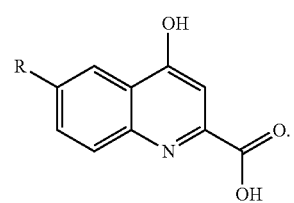

Formula (6)

10. The method of claim 6, wherein the carrier is a paper substrate, a polymer substrate, an ink, a coating, a security thread, a fiber, or a planchette.

11. The method of claim 6, wherein the radiation source is an ultraviolet (UV) light source.

12. The method of claim 6, wherein the article is a banknote, an ID document, a visa document, a tax stamp, a label, or a packaging.

13. The method of claim 6, wherein excitation of the security feature includes fluorescing of the security feature.

\* \* \* \* \*